(12) United States Patent
Ikegami (10) Patent No.: US 7,382,487 B2
(45) Date of Patent: Jun. 3, 2008

(54) PRINTING SYSTEM AND METHOD RESTRICTING FUNCTIONS OF PRINTERS, USABLE BY EACH USER

(75) Inventor: Munemitsu Ikegami, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 1097 days.

(21) Appl. No.: 10/051,019

(22) Filed: Jan. 22, 2002

(65) Prior Publication Data

US 2002/0097431 A1    Jul. 25, 2002

(30) Foreign Application Priority Data

Jan. 22, 2001    (JP)    ............................. 2001-012906

(51) Int. Cl.
*G06K 15/00*    (2006.01)
(52) U.S. Cl. ...................... 358/1.6; 358/1.15
(58) Field of Classification Search ............... 358/1.15, 358/1.14, 1.13, 1.6; 709/201, 217, 219, 203
See application file for complete search history.

(56) References Cited

U.S. PATENT DOCUMENTS 5,450,571 A * 9/1995 Rosekrans et al. ............ 703/24
5,467,434 A * 11/1995 Hower et al. ............... 358/1.15
6,314,521 B1 * 11/2001 Debry ......................... 726/10
6,385,728 B1 * 5/2002 DeBry ......................... 726/9

FOREIGN PATENT DOCUMENTS

| JP | 5-333775 | 12/1993 |
|---|---|---|
| JP | 9-48165 | 2/1997 |
| JP | 9-185474 | 7/1997 |
| JP | 9-288552 | 11/1997 |
| JP | 10-161823 | 6/1998 |
| JP | 11-164962 | 6/1999 |
| JP | 11-249836 | 9/1999 |

* cited by examiner

*Primary Examiner*—Jerome Grant, II
(74) *Attorney, Agent, or Firm*—Oblon, Spivak, McClelland, Maier & Neustadt, P.C.

(57) ABSTRACT

A printing system includes a network, a plurality of printers and client devices, each connected with the network. Each of the client devices generates printing data and header information for printing data, according to a user instruction. The header information includes a user ID, a printer ID, and a printing condition. A print restriction server registers, for each user ID, print restriction information including a printer ID, printing functions of the printer usable by the user, and issues and transmits to the client device and in response to the header information, a ticket, when each of the printing functions specified by the printing condition is included in the print restriction information. Each client device generates a printing request. Each printer executes, under specific conditions, a printing operation to print the printing data.

11 Claims, 5 Drawing Sheets

| PRINTER ID | USER ID | PRINTING CONDITION |

PRINTING SYSTEM AND METHOD RESTRICTING FUNCTIONS OF PRINTERS, USABLE BY EACH USER

BACKGROUND OF THE INVENTION

1. Field of the Invention

The present invention relates to a printing system including a plurality of printers connected with a network.

2. Discussion of the Background

Various printing systems in which a printer connected with a network is shared by a plurality of client devices on the network are known.

Japanese Patent Laid-open Publication No. 9-48165 discloses a printer which, in response to a printing request, outputs and records on a recording sheet printing data received with the printing request. The printer has a function to restrict users who may use the printer, and is configured such that printer use allowance/non-allowance information, which determines whether or not to allow use of the printer, may be registered for each user. When a printing request is received, the printer determines whether or not to allow printing based upon whether or not allowance/non-allowance information is received together with the printing request and upon the contents of the received allowance/non-allowance information.

Japanese Patent Laid-open Publication No. 9-288552 discloses a printing system in which a printer connected with a network is shared by a plurality of terminals via a print server and in which the users who can use the printer are restricted. The printer performs printing of printing data in response to a printing request received from each of the terminals. The printer includes a registration information storing device configured to register, for each of the terminals, printer use allowance/non-allowance information for restricting use of the printer. A control device controls whether or not the printer allows use of the printer when a printing request is received from each of the terminals together with use allowance/non-allowance information, based upon whether or not the received use allowance/non-allowance information is registered in the registration information storing device.

Japanese Patent Laid-open publication No. 9-185474 discloses a printing job management system in which a usage status of a network resource is precisely reflected on a charge for each printing job. The printing job management system includes a user identification information management device, which is configured to register user identification information and which is located between a first network with which a job issuing device is connected and a second network with which a printer is connected. User identification information is attached to each printing datum, and a job receiving and analyzing device extracts the user identification information from a received printing job. An authentication device determines whether or not the user identification information received from the job receiving and analyzing device is registered in the user identification information management device. A data transmission device transmits the printing data received from the job receiving and analyzing device to the printer only when the authentication device determines that the user identification information received from the job receiving and analyzing device is registered in the user identification information management device. When the data transmission device transmits the printing data to the printer, a charge calculation and management device calculates a charge for the job and registers a result of the calculation.

Japanese Patent Laid-open publication No. 10-161823 discloses a printing system including a printer shared on a network, in which each printing job record of each user is stored in a database in a print server for the printer. Based on the printing job record stored in the database, the number of prints each user may print and the printing functions of the printer each user may use may be restricted. The database stores restriction information specifying a range of usage privilege for the printer and a usage status of the printer, for each user identification information identifying each user of the printer. The restriction information specifies printing functions of the printer each user may use, and the number of prints each user can print with the printer. A printing authentication device determines whether or not to allow printing with the printer according to a printing request, referring to the database and based upon the contents of printing data and the user identification information, included in the printing request. A printing history recording device updates, after a printing operation is executed according to printing request, the usage status in the database, corresponding to the user identification information included in the printing request. A database reference and editing device makes reference to and edits the database in response to an instruction registered in advance.

In each of the above-described printing systems, information for restricting use of a printer is held in a printer or a print server for the printer, so that the decision as to whether to restrict use of the printer is made by either the printer or the print server for the printer.

However, in a printing system including a plurality of printers connected with a network, for putting restriction on the number of prints each user may print in the printing system, it is useful to manage the number of prints printed by each user at a single location in the system.

Further, some printers connected with a network can print printing data without involving a print server for the printer. In this case, the print server cannot manage the number of prints printed by each user, and accordingly restricting the number of prints for each user cannot be realized.

SUMMARY OF THE INVENTION

The present invention has been made in view of the above-discussed and other problems and addresses the above-discussed and other problems.

Preferred embodiments of the present invention provide a novel printing system and a novel printing method, in which management of the number of prints made by each user of the system is performed at a single location in the system, and in which printing functions of a printer in the system, usable by each user, may be restricted.

According to a preferred embodiment of the present invention, a printing system includes a network, a plurality of printers, each connected with the network, and a plurality of client devices, each connected with the network. Each of the client devices is configured to generate printing data for printing and header information for the printing data, according to an instruction of a user of the system. The header information includes a user identification (ID) of the user, a printer ID of the printer for printing the printing data, and a printing condition specifying printing functions of the printer used for printing the printing data with the printer. A print restriction server is configured to register, for each user ID, print restriction information including a printer ID of each printer usable by the user of the user ID. The print restriction server is also configured to restrict printing functions of the printer usable by the user. It is also configured to issue and to transmit, in response to the header information received from each client device, a ticket allowing use of the printer identified by the printer ID included in the header information, to the client device when each of the printing functions specified by the printing condition in the header information is included in the print restriction information registered for the user ID included in the header information. Each client device is configured to generate, after receiving the ticket from the print restriction server, a printing request including the printing data, the header information, and the received ticket. Each client device is also configured to transmit the printing instruction to the printer of the printer ID included in the header information. Each printer is configured to execute, when the printing request is received and if the ticket is included in the received printing request, a printing operation to print the printing data included in the printing request.

In the above-described printing system, each of the plurality of printers may be configured to authenticate the ticket included in the received printing request and to execute the printing operation when the ticket is authenticated.

Further, in the above-described printing system, the print restriction server may be configured to encrypt the issued ticket before transmitting the ticket to the client device. In this case, each of the plurality of printers is configured to decrypt the encrypted ticket before executing the printing operation.

Furthermore, in the above-described printing system, the print restriction server may be configured to assign an individual number to each ticket when issuing the ticket. In this case, the print restriction server may include a random number generating device, and the random number generating device may issue a random number for the individual number of each ticket.

According to another preferred embodiment of the present invention, a method of printing printing data in a printing system including a plurality of printers is provided. The method includes the step of generating the printing data and header information for the printing data with a client device, according to an instruction of a user of the system. The header information includes a user ID of the user, a printer ID of the printer for printing the printing data, and a printing condition specifying printing functions of the printer used for printing the printing data with the printer. The method further includes the step of registering, for each user ID, print restriction information including a printer ID of each printer usable by the user of the user ID, and printing functions of the printer, usable by the user, at a print restriction server, as well as the step of issuing, with the print restriction server, in response to the header information received from each client device, a ticket allowing use of the printer of the printer ID included in the header information, and transmitting the ticket to the client device, when each of the printing functions specified by the printing condition in the header information is included in the print restriction information registered for the user ID included in the header information. The method further includes the step of generating with the client device, after receiving the ticket from the print restriction server, a printing request including the printing data, the header information, and the received ticket, and transmitting the printing request to the printer of the printer ID included in the header information, as well as the step of executing a printing operation of the printer, when the printing request is received by the printer and if the ticket is included in the received printing request, to print the printing data included in the received printing request.

In the above-described method, the executing step may include the step of authenticating the ticket, and in this case in the executing step the printing operation is executed once the ticket has been authenticated in the authenticating step.

Further, in the above-described method, the ticket issuing and transmitting step may include the step of encrypting the issued ticket, and the executing step may include the step of decrypting the encrypted ticket. In this case, in the ticket issuing and transmitting step, the ticket is transmitted to the print requesting client device after having been encrypted in the encrypting step. Further, in the executing step, the printing operation is executed after the encrypted ticket is decrypted in the decrypting step.

Furthermore, in the above-described method, the issuing and transmitting step may include the step of assigning an individual number to each ticket. In this case, in the assigning step, a random number may be issued for the individual number of each ticket.

BRIEF DESCRIPTION OF THE DRAWINGS

A more complete appreciation of the present invention and many of the attendant advantages thereof will be readily obtained as the same becomes better understood by reference to the following detailed description when considered in conjunction with accompanying drawings, wherein.

DETAILED DESCRIPTION OF THE PREFERRED EMBODIMENTS

Referring now to the drawings, wherein like reference numerals designate identical or corresponding parts throughout the several views, preferred embodiments of the present invention are described.

Figure 1:
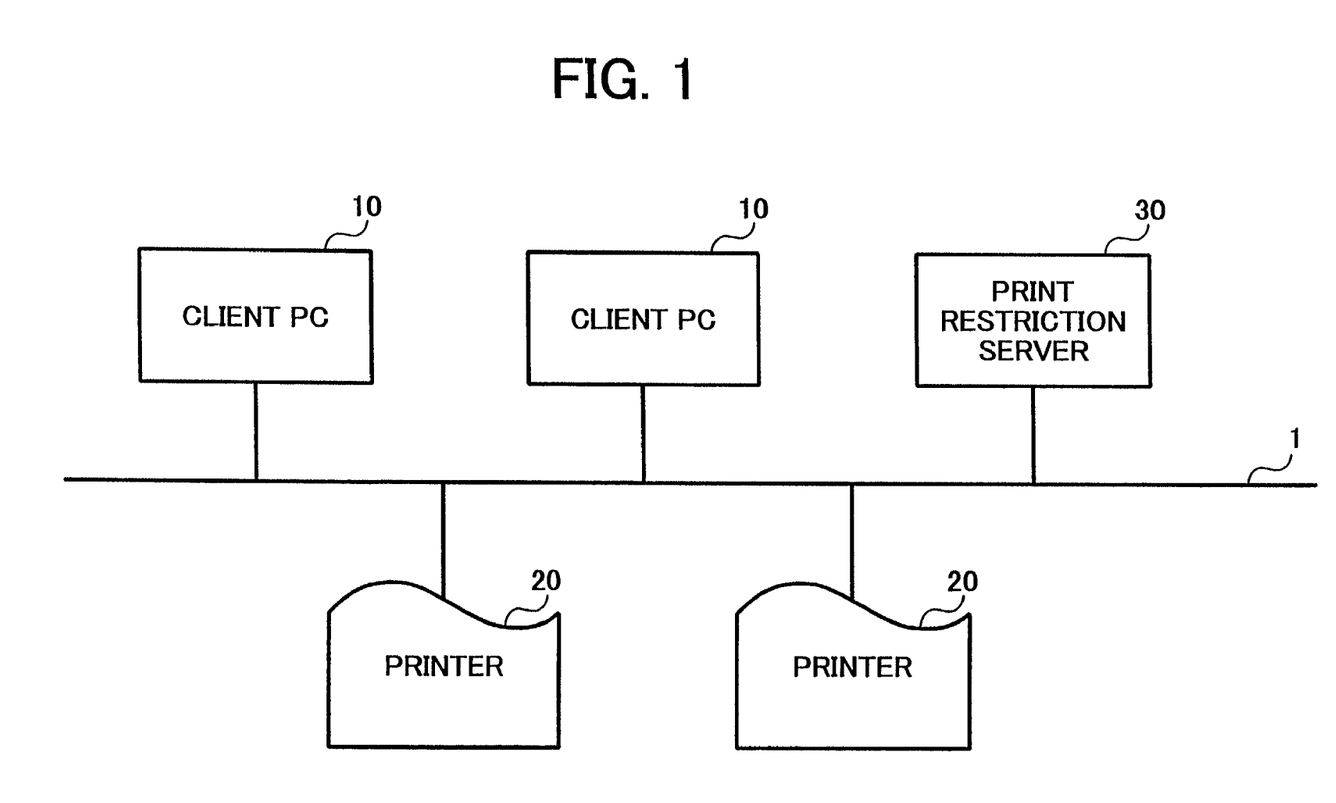
FIG. 1 is a block diagram illustrating a construction of a printing system according to a preferred embodiment of the present invention.

FIG. 1 illustrates a printing system according to a preferred embodiment of the present invention. The printing system includes a plurality of printers 20, a plurality of client PCs 10, and a print restriction server 30, connected with each other by a network 1. Each of the client PCs 10 makes a printing request to each printer 20. The print restriction server 30 issues a printing ticket which is used for executing a printing operation according to the printing request at each printer 20.

Figure 2:
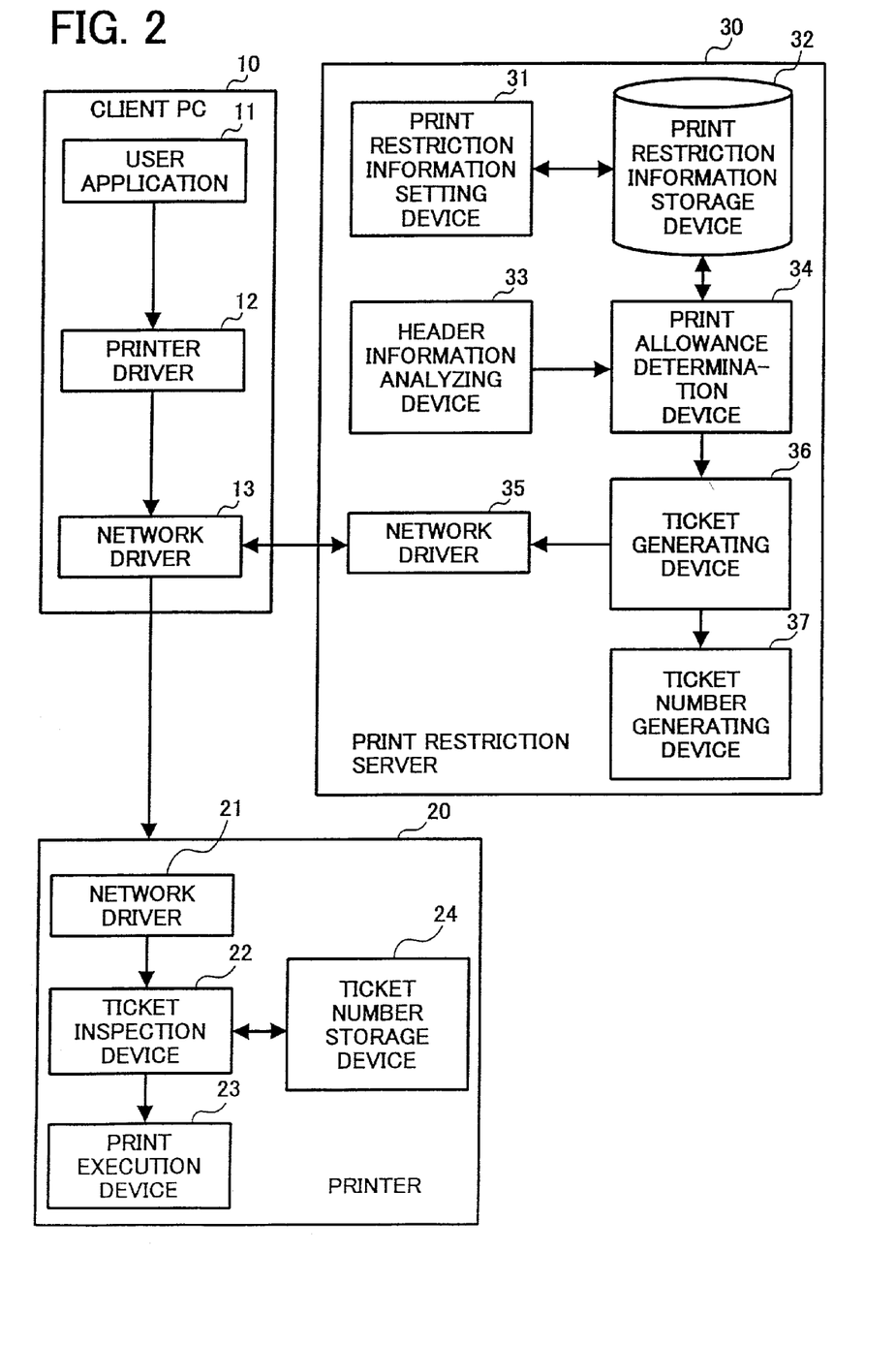
FIG. 2 is a block diagram illustrating each construction of a client device, a printer and a print restriction server of the printing system.

FIG. 2 illustrates respective exemplary constructions of the client PC 10, the printer 20 and the print restriction server 30. As illustrated in FIG. 2, each of the client PCs 10 of the printing system includes a user application 11 and a printer driver 12, and a network driver 13. The user application 11 is, for example, a word processing software, and a user of the printing system generates a document for printing by manipulating the user application 11 of each client PC 10. The printer driver 12 generates printing data of the document upon receiving a printing instruction from the user application 11, and at the same time generates header information for the printing data. The network driver 13 communicates with other devices connected with the network.

Each of the printers 20 in the printing system includes a network driver 21, a ticket inspection device 22, a print execution device 23 and a ticket number storage device 24, as illustrated in FIG. 2. The network driver 21 communicates with other devices connected with the network. The ticket inspection device 22 inspects a ticket number, a printer ID, or the like, included in the printing ticket transmitted from each client PC 10. The print execution device 23 executes a printing operation when the ticket inspection device 22 determines that the received ticket is valid. The ticket number storage device 24 stores the ticket number of each ticket with which the printing operation has been executed by the print execution device 23.

The print restriction server 30 includes a print restriction information setting device 31, a print restriction information storage device 32, a header information analyzing device 33, a print allowance determination device 34, a network driver 35, a ticket generating device 36, and a ticket number generating device 37, as illustrated in FIG. 2. The print restriction information setting device 31 sets for each user of the system registered in the system print restriction information specifying the printers 20 and the printing functions of each specified printer 20 that can be used by each user. The print restriction information set at the print restriction information setting device 31 is stored in the print restriction information storage device 32.

The network driver 35 performs communication with other devices connected with the network. The header information analyzing device 33 analyzes header information transmitted from each client PC 10. The print allowance determination device 34 determines whether to allow or not to allow printing based upon the received header information and the print restriction information stored in the print restriction information storage device 32. When the print allowance determination device 34 has determined to allow printing, the ticket generating device 36 generates a printing ticket allowing the printing and encrypts the ticket so as not to be wiretapped during transmission over the network and counterfeited by those users not allowed to use each of the printers 20. When the print allowance determination device 34 has determined to not allow printing, the print allowance determination device 34 returns a response indicating non-allowance of printing to the print requesting client PC 10. The ticket number generating device 37 generates and stores a ticket number of each ticket to manage ticket numbers generated by the ticket generating device 36.

In the above-described printing system of the present invention, when each of the client PCs 10 requests printing of printing data to one of the printers 20, before transmitting a printing request to the print requested printer 20, the print requesting PC 10 makes an inquiry to the print restriction server 30 about if printing of the printing data is allowed at the print requested printer 20 by transmitting header information for the printing data, and requests to return a ticket indicating allowance of the printing. The print requesting client PC 10 generates, after receiving the ticket, a printing request including the printing data, the header information and the received ticket, and transmits the printing request to the print requested printer 20. The print requested printer 20 receiving the printing request inspects if the received ticket is valid and if the ticket has been used previously, and executes a printing operation for printing the printing data in the received printing request if the ticket in the received printing request is valid and has not been used previously. Here, each of the printers 20 may be configured to perform the above-described inspection of the ticket by itself or in cooperation with other devices on the network.

Now, an exemplary operation of the above-described printing system is described.

Figure 3:
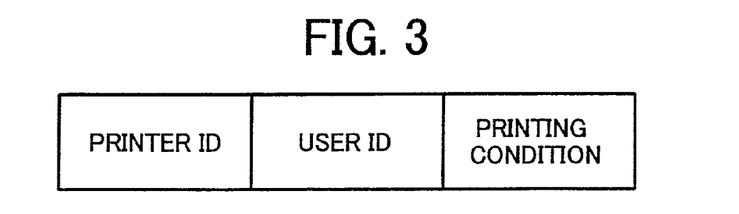
FIG. 3 is a diagram illustrating a construction of header information which is generated by the client device.

Each user of the system generates on each client PC 10 a printing request to print a document generated with the user application 11 of the client PC 10. In the client PC 10, when the printer driver 12 receives the printing request from the user application 11, the printer driver 12 generates printing data and at the same time generates header information for the printing data. FIG. 3 illustrates an exemplary construction of the header information. The header information includes a printer ID of the printer 20 for printing the printing data, a user ID of the user generating the printing request, and a printing condition specifying a printing condition for the printing data (e.g., the number of prints, whether to perform double-sided printing, whether to perform printing plural pages on a sheet, the kind of printing sheets to be used, etc.). The printer driver 12 transmits the header information to the print restriction server 30, and requests issuance of a ticket used for printing the printing data.

Figure 4:
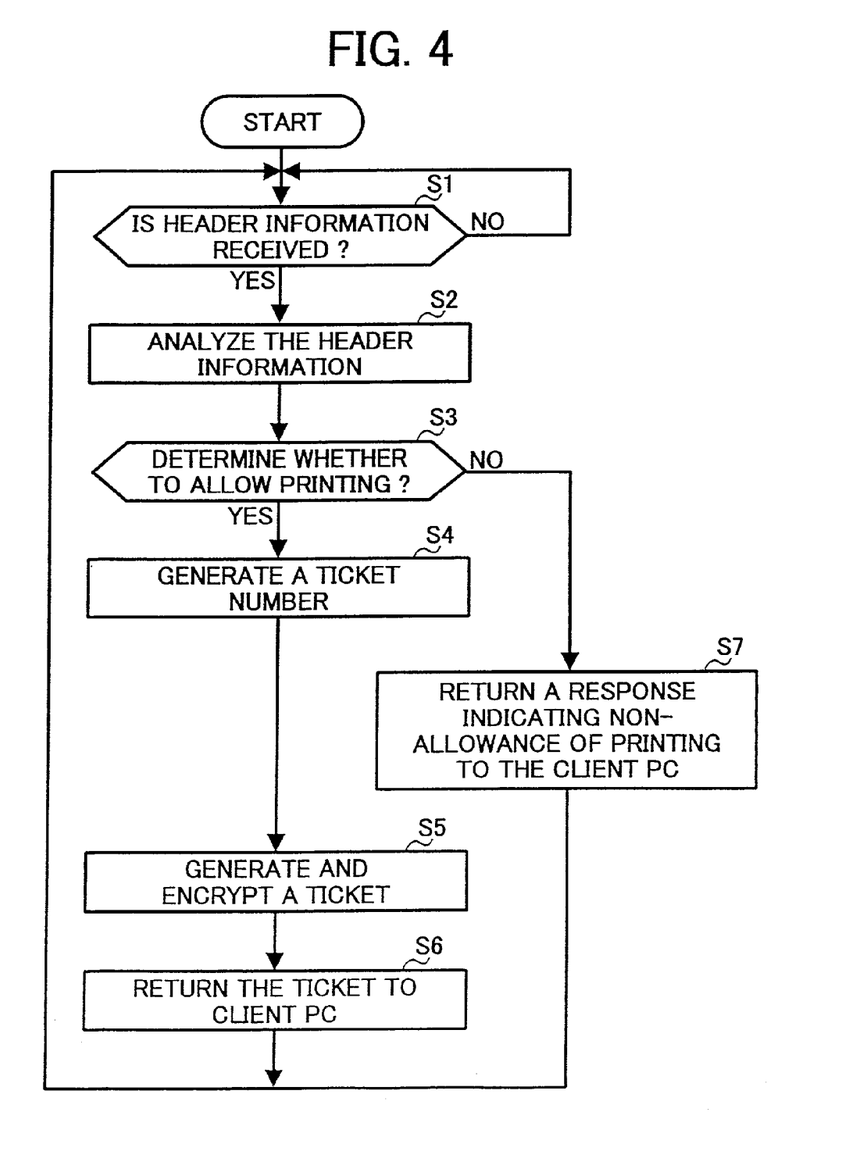
FIG. 4 is a flowchart illustrating an exemplary operation of the print restriction server.
Figure 5:
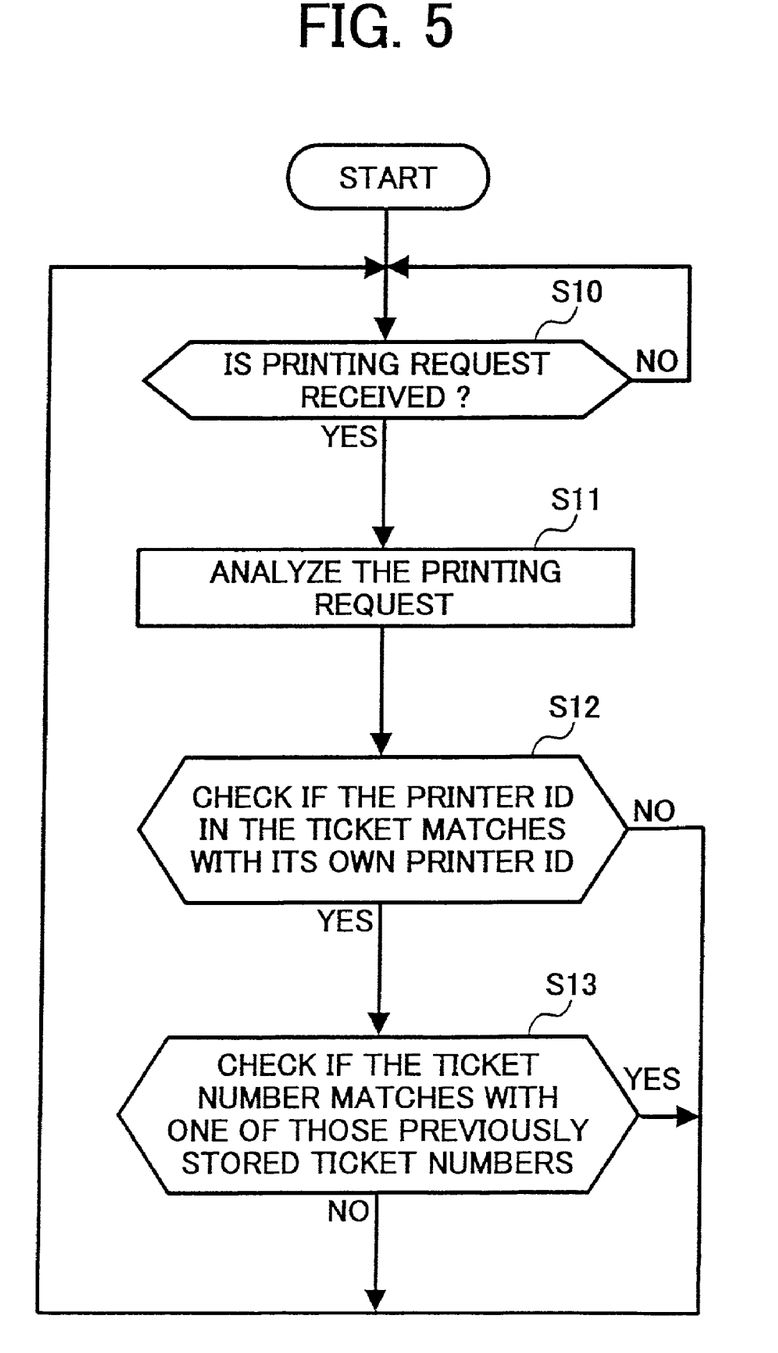
FIG. 5 is a flowchart illustrating an exemplary operation of the printer.

FIG. 4 illustrates an exemplary operation of the print restriction server 30, and FIG. 5 illustrates an exemplary operation of the printer 20 receiving a printing request.

Referring to FIG. 4, at the print restriction server 30, when header information is received from the client PC 10 requesting issuance of the ticket allowing printing of printing data (YES in step S1), the header information analyzing device 33 analyzes the received header information (step S2). The print allowance determination device 34 determines whether or not to allow the printing based on a result of analyzing the received header information and the print restriction information stored in the print restriction information storage device 32 (step S3).

In step S3, the printing functions of the print requested printer 20, which are to be used in the printing, are extracted from the received header information based upon the printing condition included in the header information. Because the printing functions of the print requested printer 20 that may be used by each user are registered in the print restriction information for the user at the print restriction information storage device 32, when the print allowance determination device 34 has determined, by referring to the print restriction information for the user at the print restriction information storage device 32, that each of the extracted functions is registered in the print restriction information for the user, the print restriction server 30 determines to allow the printing (YES in step S3). The print restriction server 30 then generates a ticket number for the ticket (S4). When all of the extracted printing functions are not registered in the print restriction information for the user, the print restriction server 30 determines not to allow the printing (NO in step S3), and the print restriction server 30 returns a response indicating non-allowance of the printing to the print requesting client PC 10 (S7). The print restriction information for each user is registered at the print restriction information setting device 31 of the print restriction server 30 by a system administrator and is stored in the print restriction information storage device 32 in advance.

Figure 6:
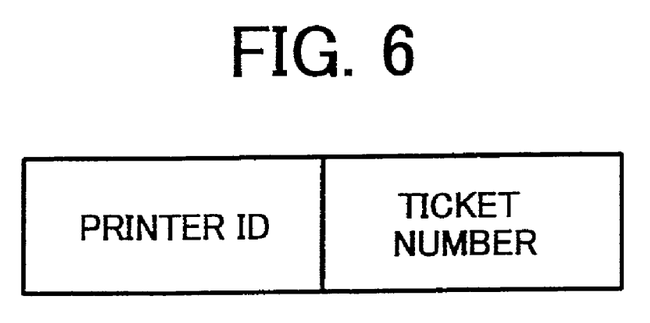
FIG. 6 is a diagram illustrating an exemplary construction of a ticket issued by the print restriction server for allowing use of the printer.

The ticket is generated and is issued at the ticket issuing device 36 of the print restriction server 30 (step S5), and the issued ticket is transmitted to the print requesting client PC 10 (S6). The ticket includes, as illustrated in FIG. 6, the printer ID included in the received header information and a ticket number. For the ticket number, a value is assigned, for example, starting with zero and incrementing the value each time a ticket is issued. Alternatively, the ticket number generating device 37 may include a random number generating device, and a random number generated by the random number generating device 37 may be assigned to the ticket number. Each of the issued ticket numbers is stored at the ticket number generating device 37. The ticket number generating device 37 stores each ticket number in a non-volatile area thereof, so that the stored ticket number is not reset when the print restriction server 30 is re-activated.

The generated ticket may be encrypted using a predetermined encryption method before being transmitted to the print requesting client PC 10 (S5), so that the ticket is prevented from being wiretapped or counterfeited by a third party during the transmission. A common encryption method such as DES (Data Encryption Standard) or a public key encryption method such as RSA (Rivest-Shamir-Adleman scheme) may be used for encryption.

Figure 7:
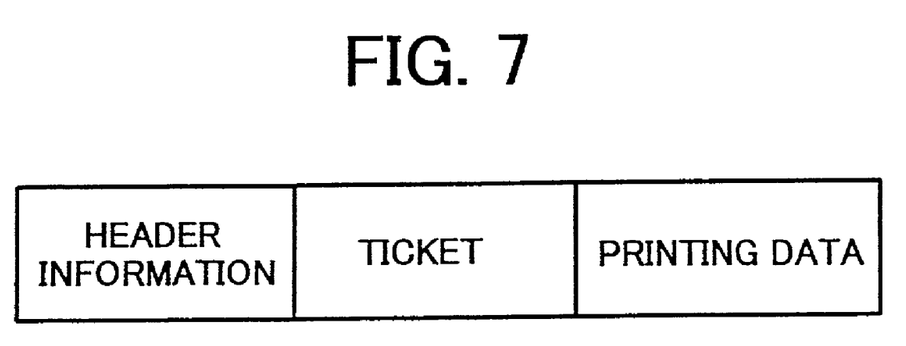
FIG. 7 is a diagram illustrating an exemplary construction of a printing request.

The client PC 10 receiving the ticket generates a printing request including the header information, the received ticket, and the printing data, as illustrated in FIG. 7, and transmits the printing request to the print requested printer 20 for printing the printing data.

Now, referring to FIG. 5, at the print requested printer 20, upon receiving the printing request (YES in step S10), the ticket inspection device 22 analyzes the printing request (S11), and checks if the printer ID included in the ticket in the printing request matches with its own printer ID (S12). If the printer ID included in the ticket does not match with its own printer ID (NO in step S12), the printing request is not executed. If the printer ID included in the ticket matches with its own printer ID, then, it is determined if the ticket number included in the ticket is one of those which have been previously used, i.e., if the ticket number matches with one of those ticket numbers stored in the ticket number storage device 24 (S13). If the ticket number is one of those which have been previously used (YES in step S13), the printing request is not executed. If the ticket number is not one of those which have been previously used (NO in step S13), the print execution device 23 executes the printing request.

The ticket number included in each received ticket is stored in the ticket number storage device 24. By thus storing in the ticket number storage device 24 the ticket number of each ticket for which a printing request has been executed, execution of a printing request using a ticket with which the printing request has been previously executed is prevented from being executed again. The ticket number of each ticket which has been used at one of the plurality of printers 20 is only stored at the printer 20 at which a printing operation for the ticket has been executed and is not stored at other printers 20. Therefore, if one ticket which has been previously used with one of the plurality of printers 20 is used for printing with another one of the plurality of printers 20, the another one of the plurality of printers 20 cannot prevent the ticket previously used from being used again by only inspecting the ticket number of the ticket. However, because each ticket includes a printer ID and a ticket number, by inspecting the printer ID included in the ticket before inspecting the ticket number, the ticket previously used can be prevented from being used again. Further, each ticket may be encrypted when the ticket is issued at the print restriction server 30 for preventing the ticket from being counterfeited for reuse. Furthermore, if the ticket is not included in a received printing request, the printer 20 receiving the printing request will not execute the printing request. Thereby, each of the plurality of printers 20 may avoid execution of a printing request for which a user has not obtained a ticket allowing use of the printer 20 from the print restriction server 30.

Numerous additional modifications and variations of the present invention are possible in light of the above teachings. It is therefore to be understood that within the scope of the appended claims, the present invention may be practiced otherwise than as specifically described herein.

The present application claims priority and contains subject matter related to Japanese Patent Application No. 2001-012906 filed in the Japanese Patent Office on Jan. 22, 2001, and the entire contents of which are hereby incorporated by reference.

What is claimed as new and is desired to be secured by Letter Patent of the United State is:

1. A printing system, comprising:
   a plurality of printers, each of said plurality of printers configured to be connected with a network;
   a plurality of client devices, each of said plurality of client devices configured to be connected with the network and configured to generate printing data for printing and header information for the printing data, according to an instruction of a user of the system, wherein said header information includes,
   at least a user ID of user,
   a printer ID of one of the plurality of printers for printing the printing data, and
   a printing condition specifying printing functions of the printer used for printing the printing data with the printer; and
   a print restriction server configured to register, for each user ID, print restriction information including a printer ID of each printer usable by a user of said each user ID, printing functions of the printer usable by the user of said each user ID,
   to issue a ticket allowing use of the printer of the printer ID included in the header information based on the header information received from each client device, and
   to transmit said ticket allowing use of the printer of the printer ID included in the header information to the client device,
   wherein each of the printing functions specified by the printing condition in the header information is included in the print restriction information registered for the user ID included in the header information,
   wherein upon receipt of the ticket from the print restriction server, each client device is configured to generate a printing request including the printing data, the header information, and the received ticket,
   wherein each client device is configured to transmit the printing request to the printer of the printer ID included in the header information, and
   each printer is configured to execute, when the printing request is received and if the ticket is included in the received printing request, a printing operation to print the printing data included in the received printing request.

2. The printing system according to claim 1,
   wherein each printer is configured to authenticate the ticket included in the received printing request and to execute the printing operation when the ticket is authenticated.

3. The printing system according to claim 1,
wherein the print restriction server is configured to encrypt the issued ticket before transmitting the ticket to the client device, and
wherein each printer is configured to decrypt the received encrypted ticket before executing the printing operation.

4. The printing system according to claim 1,
wherein the print restriction server is configured to assign an individual number to each ticket when issuing the ticket.

5. The printing system according to claim 4,
wherein the print restriction server includes a random number generating device, and
wherein the random number generating device issues a random number for the individual number of each ticket.

6. A printing system, comprising:
a plurality of printers, each configured to be connected with a network;
a plurality of client devices, each configured to be connected with the network and configured to generate printing data for printing and header information for the printing data according to an instruction of a user of the system, the header information including
  a user ID of the user,
  a printer ID of the printer for printing the printing data, and
  a printing condition specifying printing functions of the printer used for printing the printing data with the printer; and
means for registering print restriction information for each user ID, the print restriction information including
  a printer ID of each printer usable by the user of the user ID, and
  printing functions of the printer, usable by the user,
and for issuing and transmitting, in response to the header information received from each client device, a ticket allowing use of the printer of the printer ID included in the header information, to the client device, when each of the printing functions specified by the printing condition in the header information is included in the print restriction information registered for the user ID included in the header information,
wherein each client device is configured to generate, after receiving the ticket from the means for registering print restriction information and for issuing and transmitting the ticket, a printing request including the printing data, the header information, and the received ticket, and to transmit the printing request to the printer of the printer ID included in the header information, and
wherein each printer is configured to execute, when the printing request is received and if the ticket is included in the received printing request, a printing operation to print the printing data included in the received printing request.

7. A method of printing a printing data in a printing system including a plurality of printers, the method comprising the steps of:
generating the printing data and header information for the printing data with an issuing client device, according to an instruction of a user of the system, the header information including a user ID of a user, a printer ID of one of the plurality of printers for printing the printing data, and a printing condition specifying printing functions of the one of the plurality of printers used for printing the printing data with the printer;
registering, for the user ID, print restriction information including a printer ID of each printer usable by the user of the user ID, and printing functions of the printer, usable by the user, at a print restriction server;
issuing, by the print restriction server, in response to the header information received from each client device a ticket allowing use of the printer of the printer ID included in the header information, and
transmitting the ticket to the issuing client device when each of the printing functions specified by the printing condition in the header information is included in the print restriction information registered for the user ID included in the header information;
generating by the issuing client device, after receiving the ticket from the print restriction server, a printing request including the printing data, the header information, and the received ticket, and transmitting the printing request to the printer of the printer ID included in the header information; and
executing a printing operation at the printer, when the printing request is received and if the ticket is included in the received printing request, to print the printing data included in the received printing request.

8. The method according to claim 7,
wherein the executing step includes authenticating the ticket, and
wherein in the executing step the printing operation is executed when the ticket is authenticated in the authenticating step.

9. The method according to claim 7,
wherein the one of issuing and transmitting step includes encrypting the issued ticket,
wherein one of the issuing and transmitting step includes transmitting the ticket to the print requesting client device after having been encrypted in an encrypting step,
wherein the executing step includes decrypting the encrypted ticket, and
wherein the executing step executes the printing operation after the encrypted ticket is decrypted in the decrypting step.

10. The method according to claim 7,
wherein one of the issuing and transmitting steps include assigning an individual number to each ticket.

11. The method according to claim 10,
wherein the assigning step includes issuing a random number as the individual number of each ticket.

* * * * *